United States Patent Office 3,107,261
Patented Oct. 15, 1963

3,107,261
PROCESS FOR THE PRODUCTION OF PHENYL CYANATES AND PHENYL CYANATES
Hanns Gerber, Buderich, near Dusseldorf, and Rudolf Stroh, Leverkusen-Bayerwerk, Germany, assignors to Farbenfabriken Bayer Aktiengesellschaft, Leverkusen, Germany, a corporation of Germany
No Drawing. Filed Nov. 18, 1959, Ser. No. 853,678
Claims priority, application Germany Nov. 28, 1958
8 Claims. (Cl. 260—453)

This invention relates to novel chemical compounds namely phenyl cyanates and a process for their production.

Reactions of compounds of the general formula

ROMe wherein R represents an aryl radical and Me an alkali metal, with halogen cyanides, have been described in the literature. There are formed by this reaction polymer products, frequently derivatives of triazine or imidocarbonic acid esters.

It is an object of the present invention to provide novel chemical compounds more especially phenyl cyanates. It is another object of the present invention to provide a process for the production of these novel compounds which process can simply be carried out and leads to substantial yields. A further object of the present invention is to provide the phenyl cyanates by using the metal salts of sterically hindered phenols as initial materials.

These objects are accomplished in accordance with the present invention by reaction cyanogen halide on the metal salts of sterically hindered phenols in the presence of an inert organic solvent.

By sterically hindered phenols, there are understood those phenols which contain blocking substituents in the two o-positions to the hydroxyl group. This group of sterically hindered phenols include for example 2,6-di-tert.-butyl phenol, 2,6-di-tert.-amyl phenol, 2-tert.-butyl-6-amyl phenol, 2,6-di-tert.-butyl-4-methyl phenol, 2,6-di-amyl-4-methyl phenol, 2,6-di-tert.-butyl-3-vinyl phenol, 2,6-di-tert.-butyl-4-cyano phenol, 2,6-di-tert.-butyl-p-chlorophenol, 2,6-di-tert.-amyl-p-chlorophenol, 2-tert.-butyl-6-cyclohexyl phenol, 2,4,6-tri-tert.-butyl phenol but also 3,5,3′,5′-tetra-tert.-butyl-4,4′-di-hydroxy-diphenyl methane.

Examples of halogen cyanides are cyanogen chloride and cyanogen bromide both of which can easily be obtained technically.

The phenyl cyanates obtained according to the invention and having the general formula

ROCN wherein R represents an o,o-disubstituted phenyl radical, have not so far been described in the literature.

The reaction is carried out by first of all preparing a salt of the sterically hindered phenol, preferably an alkali salt such as, for example, the sodium, potassium or lithium salts, and dehydrating the salt, and then reacting it with a cyanogen halide in the presence of an inert solvent, such as for example benzene, xylene, toluene or heavy benzine. Generally, 1 mol of the sterically hindered phenol is reacted with 1 mol of the cyanogen halide, but it is advisable, especially when using readily volatile cyanogen chloride, to employ an excess thereof. The reaction temperature should be adapted to the boiling temperatures of the cyanogen halide being employed. In order to avoid losses of cyanogen halide, the reaction is advantageously carried out at about 0 to —10° C. when working with cyanogen chloride, but it is advisable to use higher temperatures, for example up to 60° C., when working with cyanogen bromide. The conversions can, in general, be carried out within the temperature range from —15 to +80° C.

The completion of the reaction is indicated by the deposition of the metal chloride or bromide forming during the reaction. When the reaction is completed, the reaction product is freed from excess cyanogen halide by degasifying, separated from the precipitated inorganic salt by filtration and freed from the solvent by distillation.

When the o,o-disubstituted phenyl cyanates obtained according to the invention are examined by ultra-red spectroscopy, it is found that a

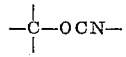

bond is present, and this is also confirmed by other chemical reactions.

The new phenyl cyanates, thus produced for the first time can be used as intermediate products for the production of pest-control agents. They constitute valuable intermediate products for the production of N-substituted carbamates, which are important as inhibitors of cholesterase and as insecticides (see Koblencek and collaborators, Journal of Agricultural and Food Chemistry, vol. 2, No. 17 (1954), page 366).

It is thus possible to obtain the corresponding carbamate from the 2,6-di-tert.-butyl phenyl cyanate by acid saponification and to transform this carbamate by treatment at room temperature with dimethyl sulphate into 2,6-di-tert.-butyl-phenyl-N-methyl carbamate (see Example 1).

The invention is further described by the following examples which are illustrative but not limitative thereof.

EXAMPLE 1

206 parts by weight of 2,6-di-tert.-butyl phenol are dissolved in 3000 parts by weight of xylene in a vessel equipped with a stirrer and a water separator, reflux condenser and internal or external cooling means and 56 parts by weight of caustic potash are added to the solution. The reaction mixture is heated to 136° C. and kept at the same temperature until all the water is driven off azeotropically. The mixture is then cooled to 0 to —5° C. and 62 parts by weight of liquid cyanogen chloride are added within 2 hours. The cooling is thereafter stopped, whereby the reaction mixture is slowly heated to room temperature within 4 hours. After filtering off from potassium chloride, the xylene is recovered by distillation. After cooling, the phenyl cyanate precipitates from the residue in crystalline form. There are obtained 225 parts by weight of 2,6-di-tert.-butyl phenyl cyanate, which can easily be purified by recrystallisation from alcohol, acetone or benzine hydrocarbons. M.P.=52° C.

*Preparation of 2,4-Di-Tert.-Butyl-Phenyl-N-Methyl Carbamate*

28 parts by weight of 2,6-di-tert.-butyl phenyl cyanate are dissolved in 150 parts by weight of carbon tetrachloride and heated to 70° C. At this temperature, 78 parts by weight of 50% sulfuric acid are added within 1 hour while stirring vigorously. The reaction mixture is stirred for another 48 hours at 70° C. After cooling, the substance is separated from the sulfuric acid and the solvent (carbon tetrachloride) is largely evaporated by distillation. The resulting 2,6-di-tert.-butyl phenyl carbamate precipitates as crystals. M.P. 152° C.

31 parts by weight of 2,6-di-tert.-butyl phenyl carbamate are dissolved in 300 parts by weight of benzene and 126 parts by weight of dimethyl sulfate are added thereto. The reaction mixture can be left to stand for 48 hours at room temperature, whereupon it is decomposed with water, the benzene solution is separated out and the mixture concentrated by distillation. The crystalline residue is freed from the 2,6-di-tert.-butyl-N-dimethyl phenyl carbamate by selective crystallization from ligroin and isopropyl alcohol. There are obtained 24 parts by weight of 2,6-di-tert.-butyl-N-methyl phenyl carbamate, M.P. 132 to 133° C. which has the same effect on flies and mites as the 2,6-di-tert.-butyl-phenyl-N-methyl carbamate described on page 336 of the Journal of Agricultural and Food Chemistry, vol. 2, No. 17 (1954).

EXAMPLE 2

The procedure is as described in Example 1, but the suspension of the phenolate in xylene is only allowed to cool to room temperature and such a quantity of gaseous cyanogen chloride is passed at this temperature in 1 hour through the reaction mixture that the cyanogen chloride is present in a slight molar excess.

The working up and yield of 2,6-di-tert.-butyl phenyl cyanate correspond to the data given in Example 1.

Similar results are obtained if the reaction is carried out at 50 to 60° C. instead of at room temperature.

EXAMPLE 3

The procedure is as set out in Example 1, but the suspension of the phenolate in xylene is only allowed to cool to room temperature and 106 parts by weight of cyanogen bromide are introduced instead of cyanogen chloride. The working up and yield correspond to the data given in Example 1.

EXAMPLE 4

The procedure is as described in Example 1, but the 2,6-di-tert.-butyl phenol is replaced by 232 parts by weight of 2,6-di-tert.-butyl-3-vinyl phenol. After distilling off the xylene, an oily residue is left, from which the 2,6-di-tert.-butyl-3-vinyl cyanate is obtained with a yield of 230 parts by weight by high vacuum distillation (172° C./10 mm).

EXAMPLE 5

The procedure is as described in Example 1, but heavy benzine is used as the solvent instead of xylene and the 2,6-di-tert.-butyl phenol is replaced by 212 parts by weight of 4,4'-dihydroxy-3,5,3',5'-tetra-tert.-butyl diphenyl methane. 235 parts by weight of 3,5,3',5'-tetra-tert.-butyl diphenyl methane-4,4'-dicyanate are obtained. M.P.=206° C.

EXAMPLE 6

The procedure is as described in Example 1, but heavy benzine is used instead of xylene as the solvent and the 2,6-di-tert.-butyl phenol is replaced by 231 parts by weight of 2,6-di-tert.-butyl-4-cyano phenol. 250 parts by weight of 2,6-di-tert.-butyl-4-cyano phenyl cyanate are obtained. M.P.=83° C.

EXAMPLE 7

The procedure is as described in Example 1, but the 2,6-di-tert.-butyl phenol is replaced by 220 parts by weight of 2,6-di-tert.-butyl-4-methyl phenol. In order to obtain white products, it is necessary to carry out all working steps with exclusion of air and in the presence of an inert gas, such as for example nitrogen. 230 parts by weight of 2,6-di-tert.-butyl-4-methyl phenyl cyanate are obtained. M.P.=74° C.

EXAMPLE 8

In the apparatus which is described in Example 1, 262 parts by weight of 2,4,6-tri-tert.-butyl phenol are dissolved in 1200 parts by weight of tetrahydrofuran, whereupon 40 parts by weight of potassium are added, the mixture is slowly heated to 65 to 70° C. and kept at this temperature for 6 hours. After cooling to —10° C., 120 parts by weight of cyanogen chloride are added within 2 hours. It is necessary to maintain the temperature of the reaction mixture below —5° C. The mixture is stirred for another 4 hours at this temperature. The temperature is then allowed to rise slowly to room temperature and the potassium chloride which has formed is removed by filtration and the solvent (tetrahydrofuran) is removed by distillation under normal pressure. The remaining crystalline residue is recrystallised several times from methanol and there are obtained 230 parts by weight (80% of the theoretical) of 2,4,6-tri-tert.-butyl phenyl cyanate. M.P. 156 to 157° C., B.P.$_{10}$: 160° C.

EXAMPLE 9

288 parts by weight of sodium 2,6-di-tert.-butyl phenolate are suspended in 1000 parts by weight of light benzine and cooled to —5° C. 70 parts by weight of liquid cyanogen chloride are added at this temperature while stirring vigorously. Working up is then carried out as described in Example 1 and 220 parts by weight of 2,6-di-tert.-butyl phenyl cyanate are obtained.

EXAMPLE 10

The procedure is as described in Example 1 and the 2,6-di-tert.-butyl phenol is replaced by 192 parts by weight of 2-isopropyl-6-tert.-butyl phenol. 180 parts by weight of 2-isopropyl-6-tert.-butyl phenyl cyanate are obtained, B.P. 139° C./10 mm.

EXAMPLE 11

The procedure is as described in Example 1 and the 2,6-di-tert.-butyl phenol is replaced by 240 parts by weight of 2,6-di-tert.-butyl-4-chlorophenol. 238 parts by weight of 2,6-di-tert.-butyl-4-chlorophenyl cyanate are obtained. B.P.: 158° C./10 mm., M.P.: 67° C.

What we claim is:

1. A cyanate of a sterically hindered phenol which is selected from the group consisting of compounds of the formulae

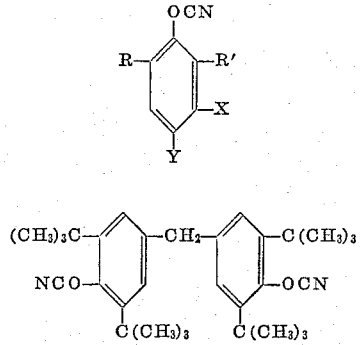

and wherein R and R' each represent a member selected from the group consisting of tert.-butyl, tert.-amyl, amyl, isopropyl and cyclohexyl groups, X represents a member selected from the group consisting of hydrogen and vinyl, and Y represents a member selected from the group consisting of hydrogen, methyl, cyano, tert.-butyl and chlorine.

2. 2-isopropyl-6-tert.-butyl-phenyl cyanate.
3. 2,6-di-tert.-butyl phenyl cyanate.
4. 2,6-di-tert.-butyl-3-vinyl phenyl cyanate.
5. 3,5,3',5'-tetra-tert.-butyl-diphenyl methane-4,4'-dicyanate.
6. 2,4,6-tritert.-butyl phenyl cyanate.
7. Process for the production of phenyl cyanates which are substituted by alkyl groups in both o-positions with respect to the cyanate group which comprises reacting an alkali metal salt of a sterically hindered phenol which is a member selected from the group consisting of 2,6-di-tert.-butyl phenol, 2,6-di-tert.-amyl phenol, 2-tert.-butyl-6-amyl phenol, 2,6-di-tert.-butyl-4-methyl phenol 2-isopropyl-6-tert.-butyl phenol, 2,6-diamyl-4-methyl phenol, 2,6-di-tert.-butyl-3-vinyl phenol, 2,6-di-tert.-butyl-4-cyanophenol, 2,6-di-tert.-butyl-p-chlorophenol, 2,6-di-tert.-amyl-p-chlorophenol, 2-tert.-butyl-6-cyclohexyl phenol 2, 4, 6-tri-tert.-butyl phenol and 3,5, 3',5'-tetra-tert.-butyl-4,4'-di-hydroxy-diphenyl methane with at least the equivalent amount of a cyanogen halide which is a member selected from the group consisting of cyanogen chloride and cyanogen bromide, referred to the phenolic hydroxyl group in the presence of an inert organic solvent selected from the group consisting of benzine, xylene, toluene, and tetrahydrofuran at a temperature between −15 degrees C. and plus 80 degrees C. and recovering the phenyl cyanate thereby formed from the reaction mixture.

8. Process according to claim 7 wherein said alkali metal salt is a member selected from the group consisting of sodium and potassium salts.

References Cited in the file of this patent
UNITED STATES PATENTS
2,903,487     Coffield _____ Sept. 8, 1959